(12) United States Patent
Prendergast et al.

(10) Patent No.: US 12,050,707 B2
(45) Date of Patent: Jul. 30, 2024

(54) SYSTEMS AND METHODS FOR PROCESSING REQUESTS FOR REAL-TIME TRANSFERS OF RESOURCES

(71) Applicant: The Toronto-Dominion Bank, Toronto (CA)

(72) Inventors: Jonathan Joseph Prendergast, West Chester, PA (US); Thomas Osman Kelly, Wenonah, NJ (US); Christopher Mark Jones, Villanova, PA (US); Harshad Laxmanbhai Patel, Chester Springs, PA (US)

(73) Assignee: The Toronto-Dominion Bank, Ontario (CA)

( * ) Notice: Subject to any disclaimer, the term of this patent is extended or adjusted under 35 U.S.C. 154(b) by 285 days.

(21) Appl. No.: 17/401,465

(22) Filed: Aug. 13, 2021

(65) Prior Publication Data
US 2023/0046068 A1 Feb. 16, 2023

(51) Int. Cl.
*G06F 21/62* (2013.01)
*G06F 9/54* (2006.01)
*G06F 16/955* (2019.01)
*G06Q 20/08* (2012.01)
*G06Q 20/40* (2012.01)
*G06Q 30/0207* (2023.01)
*H04L 9/40* (2022.01)

(52) U.S. Cl.
CPC .......... *G06F 21/6218* (2013.01); *G06F 9/541* (2013.01); *G06F 16/9566* (2019.01); *G06Q 20/085* (2013.01); *G06Q 20/4014* (2013.01); *G06Q 30/0224* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 8,639,567 B2 | 1/2014 | Winters | |
| 8,781,889 B2 | 7/2014 | Walker et al. | |
| 9,495,690 B2 | 11/2016 | Ovick et al. | |
| 9,953,373 B2 | 4/2018 | Winters | |
| 10,311,406 B2 | 6/2019 | Kassemi et al. | |
| 10,360,578 B2 | 7/2019 | Basu et al. | |
| 10,909,563 B1 | 2/2021 | Aaron et al. | |
| 2003/0005297 A1* | 1/2003 | Fichtner | G06F 21/6236 713/168 |

(Continued)

FOREIGN PATENT DOCUMENTS

WO 2018204822 11/2018

*Primary Examiner* — Kaveh Abrishamkar
(74) *Attorney, Agent, or Firm* — Rowand LLP (57) ABSTRACT

A computer-implemented method is disclosed. The method includes: receiving transfer parameters associated with a request for a first transfer of resources, the transfer parameters including an identifier of a designated transferor associated with the first transfer; determining that the transferor is eligible to access at least one protected data source based on the transfer parameters; generating a request message for the request including reference data for accessing the at least one protected data source; and providing, to a computing device associated with the transferor, the request message.

19 Claims, 6 Drawing Sheets

(56) References Cited

U.S. PATENT DOCUMENTS

| | | |
|---|---|---|
| 2003/0009694 A1* | 1/2003 | Wenocur ............. H04L 63/0823 |
| | | 713/176 |
| 2005/0114367 A1* | 5/2005 | Serebrennikov ....... G06Q 20/34 |
| | | 707/E17.115 |
| 2011/0231224 A1 | 9/2011 | Winters |
| 2011/0231225 A1 | 9/2011 | Winters |
| 2011/0231258 A1 | 9/2011 | Winters |
| 2011/0231305 A1 | 9/2011 | Winters |
| 2013/0282461 A1 | 10/2013 | Ovick et al. |
| 2014/0164083 A1 | 6/2014 | Wilkes |
| 2014/0181013 A1* | 6/2014 | Micucci .................. H04L 63/08 |
| | | 707/610 |
| 2016/0196484 A1* | 7/2016 | Ciavatta ........... G06K 19/06037 |
| | | 235/462.1 |
| 2018/0189817 A1 | 7/2018 | Barak et al. |
| 2021/0209077 A1* | 7/2021 | Snellman .............. G06F 16/219 |
| 2023/0128813 A1* | 4/2023 | Babani ................ G06F 21/6245 |
| | | 726/4 |

* cited by examiner

SYSTEMS AND METHODS FOR PROCESSING REQUESTS FOR REAL-TIME TRANSFERS OF RESOURCES

TECHNICAL FIELD

The present application relates to data processing and, more particularly, to systems and methods for processing requests for real-time transfers of resources in a networked environment.

BACKGROUND

In a computer network, resources may be shared or transferred between nodes of the network. For example, computing resources, such as processing units, memory, etc., may be transferred between nodes in order to attain a desired distribution of resources for a computer network. As another example, electronic transfers of data between data records may effect changes to the quantum of resources associated with the data records.

Requests for transfer of resources may be directed to a computing system that processes and handles such requests. By way of example, a server computer that manages a plurality of resource accounts may handle requests to share, distribute, or otherwise transfer resources that are associated with the accounts. For such systems, processing requests for real-time (or substantially in real-time) transfers of resources may pose a number of challenges. Any errors or delays which may be introduced in processing of requests for real-time transfers can cause subsequent processes and actions by the intended transferees to be delayed or to fail entirely. Additionally, the speed at which such transfers are conducted may increase the risk of errors and/or security attacks. For example, real-time transfers may not be subjected to comprehensive security checks for verifying the identity of transferees. In the absence of proper security measures, the resources that are transferred may be exposed to access attacks by unauthorized parties.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

In an aspect, the present disclosure describes a computing device. The computing device includes a processor, a communications module coupled to the processor, and a memory coupled to the processor. The memory stores instructions that, when executed, configure the processor to: receive transfer parameters associated with a request for a first transfer of resources, the transfer parameters including an identifier of a designated transferor associated with the first transfer; determine that the transferor is eligible to access at least one protected data source based on the transfer parameters; generate a request message for the request including reference data for accessing the at least one protected data source; and provide, to a computing device associated with the transferor, the request message.

In some implementations, the at least one protected data source may comprise a web resource and the reference data may comprise a uniform resource locator (URL) associated with the web resource.

In some implementations, the at least one protected data source may comprise an access-restricted message and the reference data may comprise a hyperlink associated with the message.

In some implementations, determining that the transferor is eligible to access the at least one protected data source may include: generating an application programming interface (API) request based on the transfer parameters for querying a first server whether the transferor is eligible to access one or more of a set of defined offers; and determining eligibility of the transferor based on a response associated with the API request.

In some implementations, each of the defined offers may be associated with respective criteria and determining that the transferor is eligible may include determining that the criteria associated one or more of the defined offers are satisfied based on transferor data associated with the transferor.

In some implementations, the transferor data may include historical transactions data associated with the transferor.

In some implementations, the reference data may comprise a unique identifier associated with the at least one protected data source.

In some implementations, providing the request message may include: causing to be displayed, via a user interface on the computing device, message data of the request message; and providing, on the user interface, one or more user interface elements associated with selectable options for accessing the at least one protected data source.

In some implementations, providing the user interface element may include: identifying a first data field associated with the request message; and in response to determining that the transferor is eligible to access the at least one protected data source, causing a current data value associated with the first data field to be replaced with the reference data for accessing the at least one protected data source in the request message.

In some implementations, message data of the request message may include a flag indicating a content type associated with the at least one protected data source.

In another aspect, the present disclosure describes a computer-implemented method. The method includes: receiving transfer parameters associated with a request for a first transfer of resources, the transfer parameters including an identifier of a designated transferor associated with the first transfer; determining that the transferor is eligible to access at least one protected data source based on the transfer parameters; generating a request message for the request including reference data for accessing the at least one protected data source; and providing, to a computing device associated with the transferor, the request message.

In yet another aspect, a non-transitory computer readable storage medium is disclosed. The computer readable storage medium contains instructions thereon which, when executed by a processor, configure the processor to: receive transfer parameters associated with a request for a first transfer of resources, the transfer parameters including an identifier of a designated transferor associated with the first transfer; determine that the transferor is eligible to access at least one protected data source based on the transfer parameters; generate a request message for the request including reference data for accessing the at least one protected data source; and provide, to a computing device associated with the transferor, the request message.

Other aspects and features of the present application will be understood by those of ordinary skill in the art from a review of the following description of examples in conjunction with the accompanying figures. Example embodiments of the present application are not limited to any particular operating system, system architecture, mobile device architecture, server architecture, or computer programming language.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the terms "transferor" and "transferee" may be used interchangeably with "sender" and "recipient", respectively, in the context of describing transfers of resources. Specifically, a transferor of a resource transfer will be understood to be an entity that sends, or causes to be sent, certain resources to a transferee/recipient. The transferor may send (or cause to be sent) the resources in response to receiving a "resource transfer request". As will be described in greater detail below, a resource transfer request may indicate, at least, a designated transferor, an intended recipient, and a quantity of resources that is requested to be transferred from the transferor to the recipient.

Various types of resources, such as computing resources (e.g., processing units, memory, file storage), electronic data, etc., may be transferred between computing systems in a networked environment. A "real-time" resource transfer provides instantaneous (or near instant) exchange of resources. The speed at which real-time resource transfers are conducted may increase the risk of errors and/or security attacks. For example, real-time resource transfers may not be subjected to comprehensive security checks that are intended to verify the identity of transferees of the transfers. In the absence of suitable security measures, the resources that are transferred may be exposed to access attacks by unauthorized parties.

In certain contexts, resource transfers can be expressly requested. Specifically, a transfer requesting entity, such as a network node, may request that resources be transferred from a transferor to a designated recipient. Such requests (referred to as "resource transfer requests" herein) may identify, at least, a transferor, a recipient, and a quantity of resources that is requested to be transferred. If the request is accepted or approved by the transferor, a certain quantity of resources associated with the transferor may be transferred (e.g., transmitted, communicated, or otherwise delivered) to the recipient in accordance with one or more transfer parameters that are specified in the request.

A transferor entity associated with a resource transfer may, by virtue of past or future transfers of resources, become eligible to access certain protected (i.e., access-restricted) resources. As an example, if a network node transfers (i.e., lends) computing resources (e.g., memory, CPU, etc.) to other nodes of the network in response to resource transfer requests such that a quantity of its own resources falls below a defined threshold, the transferor node may be eligible to access previously unavailable resources (e.g., for its computing needs. As another example, a merchant may send a request for payment (RFP) to a customer in processing a purchase transaction. The RFP may, for example, indicate an amount that is requested to be paid to the merchant. The customer may become eligible for offers (e.g., discounts, rebates, etc.) of the merchant, based on past transactions of the customer with the merchant and/or upon successful completion of the payment for the purchase transaction. Such offers may only be presented to paying customers, i.e., customers that provide suitable responses to RFPs; the offers may not be available, for example, to non-customers of the merchant.

In this way, resource transfer requests (e.g., RFPs) may be associated with offers that can be extended to eligible transferor entities. In particular, offers of access to specific resources may be available for transferor entities that are associated with resource transfer requests. Typically, the processing of resource transfers is performed separately and independently of the management of offers. For example, a request for payment that is directed to a customer of a merchant may be processed independently of the management (e.g., identification and notification) of the merchant's offers which may be available for and presented to the customer. A first system or entity may be tasked with generating and transmitting the request for payment to a specific customer, while a second system/entity may be tasked with determining when the redemption criteria associated with certain offers of the merchant are satisfied by the customer and notifying the customer about the same. Having separate systems for processing resource transfer requests and offers management may lead to inefficient use and duplicative allocation of computing resources for said systems. Furthermore, such independent processing may result in a time delay between when the redemption criteria of offers are satisfied and when the eligible customer is actually presented with the offers for which they are eligible.

The present disclosure provides a system that integrates transfer request processing and offers management for transferor entities that are associated with real-time resource transfers.

Figure 1:
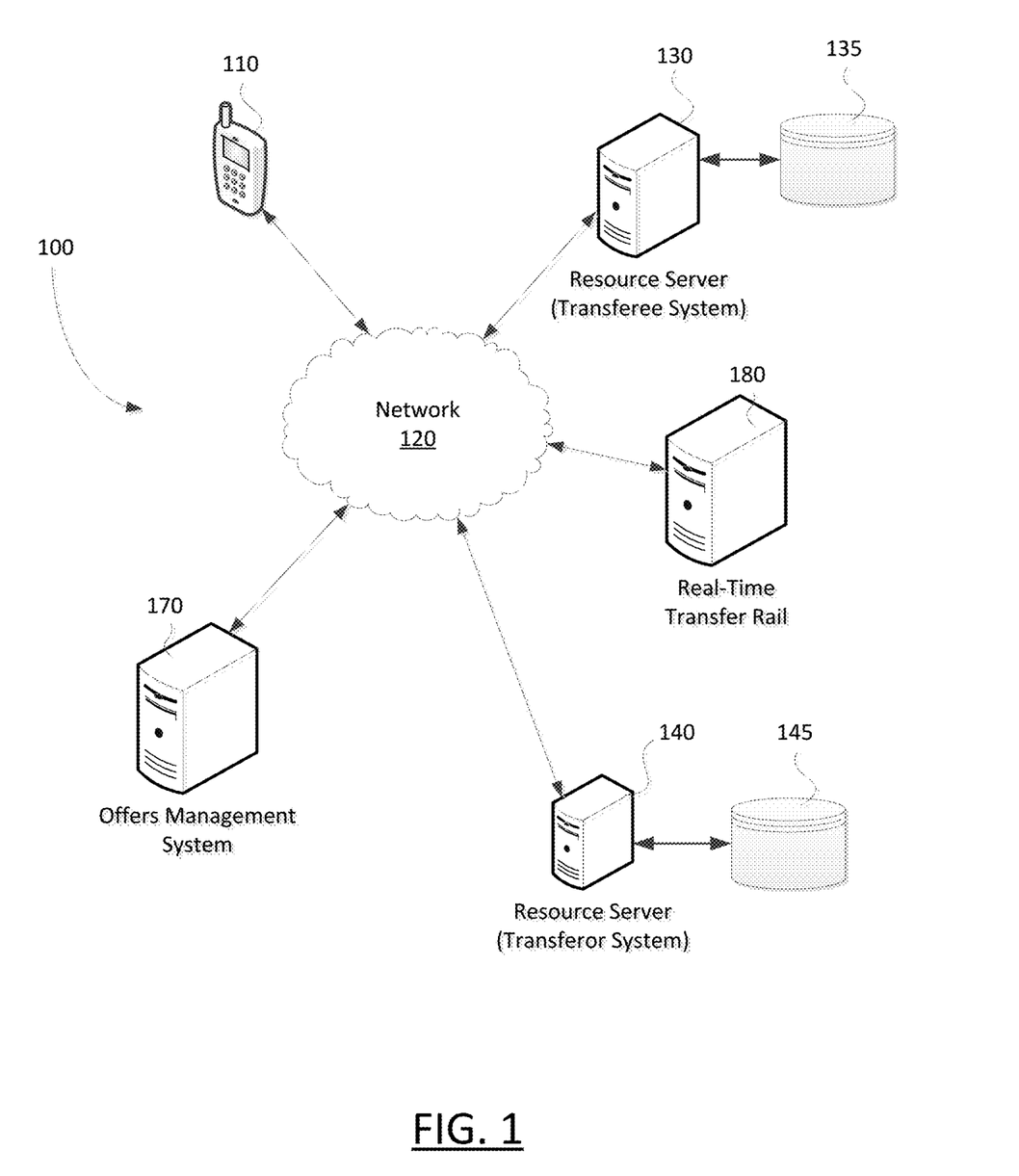
FIG. 1 is a schematic diagram illustrating an operating environment of an example embodiment.

FIG. 1 is a schematic diagram illustrating an operating environment of an example embodiment. In particular, FIG. 1 illustrates exemplary components of a system 100 for processing transfers of resources between computing systems. As a specific example, the system 100 may be implemented to facilitate processing and handling of requests to transfer funds (i.e., requests for payments) between accounts (or data records associated therewith). More generally, the components of system 100 enable processing of resource transfer requests that are directed to a resource account management system.

As illustrated, the resource servers 130 and 140 (which may also be referred to as resource account management (RAM) systems) and one or more client devices 110 communicate via the network 120. The client device 110 is a computing device. For example, the client device 110 may be a device of an entity having resources that are associated with one of the resource servers (e.g., resource server 130). The resource servers 130 and 140 may track, manage, and maintain resources, make lending decisions, and/or lend resources for a plurality of clients. The resources may, for example, include computing resources, such as memory or processor cycles. By way of further example, the resources may include stored value, such as fiat currency, which may be represented in one or more databases. For example, as shown in FIG. 1, the resource server 130 may be coupled to a database 135, which may be provided in secure storage. The secure storage may be provided internally within the resource server 130 or externally; the secure storage may, for example, be provided remotely from the resource server 130. In some embodiments, the secure storage may include one or more data centers. The data centers may, for example, store data with bank-grade security.

The resource servers 130 and 140 may each include a resource request processing engine (not shown in FIG. 1). A resource request processing engine may be implemented to automatically process resource transfer requests that are received at a resource server. Specifically, the resource request processing engine may be configured to process requests to transfer resources that are associated with one or more resource accounts managed by the resource server. The resource request processing engine may process resource transfer requests in accordance with defined handling actions. For example, the resource request processing engine may be configured to automatically process resource transfer requests without manual intervention by related entities (e.g., a resource server administrator, clients associated with the resource accounts, etc.) for the resource transfer requests.

The databases 135 and 145 may each include records for a plurality of accounts and at least some of the records may define a quantity of resources associated with an entity. For example, the entity that is associated with the client device 110 may be associated with a resource account having one or more records in the database 135. The data records may reflect a quantity of stored resources that are associated with the entity. Such resources may include owned resources and, in at least some embodiments, borrowed resources (e.g., resources available on credit). The quantity of resources that are available to or associated with an entity may be reflected by a balance defined in an associated record such as, for example, a bank balance.

The databases 135 and 145 may also store transfer configuration rules data comprising rules for handling resource transfer requests that are directed to the resource servers 130 and 140, respectively. Various transfer configuration rules may be defined for specifying handling actions for automatically processing resource transfer requests to the resource servers 130 and 140. For example, upon receiving a resource transfer request (e.g., from a client device 110, a transfer request issuing server, etc.), the resource server 130 (or 140) may access the database 135 (or 145) to identify transfer configuration rules that are relevant to the resource transfer request and determine one or more suitable handling actions based on the identified rules. Additionally, or alternatively, the transfer configuration rules data may be stored externally of the databases 135 and 145.

The resource servers 130 and 140 may, for example, be financial institution servers and the entity associated with a client device 110 may be a customer of a financial institution operating one of the financial institution servers.

As shown in FIG. 1, the system 100 may include a real-time transfer rail 180. In at least some embodiments, the real-time transfer rail 180 may be a payment rail. For example, the real-time transfer rail 180 may be hosted by a payment system that includes a real-time payment server. The payment system may be associated with a third-party and be configured to receive a resource (e.g., data) transfer request. The resource transfer request may include a request to transfer resources from a first data record to a second data record. The first data record may include a data record associated with a transferor and the second data record may include a data record associated with a recipient. For example, the first data record may be associated with a first financial institution database and the second data record may be associated with a second financial institution database.

The request to transfer resources may be a request to transfer data such as, for example, units of value. The units of value may include a quantity of currency. The transferor may initiate the resource transfer request using, for example, a computing device.

The resource transfer request may be formatted as an ISO2022 message and may include one or more parameters. The ISO2022 format is a data-rich messaging format that provides the real-time transfer rail 180 with a clear and nuanced format of data. The one or more parameters may be included as metadata in the resource transfer request. The parameters may include, for example, resource definition data. The resource definition data defines what is requested to be transferred. By way of example, the resource definition data may define a resource that is stored in or otherwise associated with a data record associated with the transferor. The resource may represent units of value, such as a quantity of a currency.

Responsive to receiving a resource transfer request, the payment system may complete the resource transfer request using the real-time transfer rail 180. Specifically, the real-time payment server may be configured to receive the resource transfer request and to facilitate the resource transfer from the first data record associated with the transferor to the second data record associated with the recipient in real-time. In some embodiments, the resource transfer may be irrevocable; that is, the transferor may not be able to retrieve the transferred resources after the transfer.

The real-time transfer rail 180 is configured to complete resource transfer requests in real-time or substantially in real-time. In at least some embodiments, real-time is defined as being within seconds. Certain factors, such as network traffic, may limit the immediacy of real-time transfers and/or processing of transfer requests.

The client device 110 may be used, for example, to configure a request to transfer resources from a resource account associated with the client device 110. More particularly, the client device 110 may be used to generate requests to transfer resources from a resource account (or data records associated therewith) of an entity operating the client device 110. A resource transfer may, for example, involve a transfer of data between a record in the database 135 associated with an account at the resource server 130 and another record in the database 135 (or in another database, such as the database 145). The data involved in the resource transfer may, for example, be units of value and the records involved in the resource transfer may be adjusted in related or corresponding manners. For example, during a resource transfer, a record associated with the intended recipient (i.e., transferee) of the transfer may be adjusted to reflect an increase in value resulting from the transfer, whereas the record associated with the entity (i.e., transferor) initiating the transfer may be adjusted to reflect a decrease in value which is at least as large as the increase in value applied to the record associated with the transferee.

The system 100 of FIG. 1 also includes an offers management system 170. The offers management system 170 manages offers data of offers for a plurality of sponsoring entities (e.g., merchants). An "offer" represents authorization to access a specific protected resource, functionality, and/or data source and may include, for example, digital or physical products, discounts (e.g., on future transactions), incentives, rebates, coupons, rewards, cash-backs, and the like. The offers management system 170 may comprise a database that is configured to store, edit, update, and delete information relating to offers of sponsoring entities. In at least some embodiments, the offers management system 170 may be configured to determine when a client/customer becomes eligible for an offer. For example, the offers management system 170 may store (or have access to) redemption criteria data associated with a plurality of offers, and may detect when all or at least a subset of the redemption criteria for certain offers are satisfied by a customer.

The offers management system 170 may be associated with one or more merchants, and the offers management system 170 may facilitate identifying offers of the merchants for which the merchants' customers become eligible. That is, the offers management system 170 may manage only the offers of specific merchants and their customers. Alternatively, the offers management system 170 may be a generic offers engine that is not associated with any specific merchant/biller. For example, the offers management system 170 may be associated with a provider of a "buy now, pay later" (BNPL) service or other similarly generic services which may be available to transacting customers.

The information stored by the offers management system 170 may be accessible, for example, via an interface such as an application programming interface (API). In particular, the offers management system 170 may be queried using an interface (e.g., API) in order to obtain offers data (e.g., offer specification, redemption criteria, etc.) of offers for which customers are or may become eligible.

In some embodiments, the offers management system 170 may serve a notification function, by notifying customers of specific offers and providing associated offers data. For example, the offers management system 170 may generate notifications indicating when customers become eligible for various offers of sponsoring entities. The notifications may be provided directly to client devices of the customers or to other computing systems that can relay the offers data to the customers.

While the resource servers 130, 140 and offers management system 170 are illustrated as separate components of system 100, in some embodiments, the offers management system 170 may be integrated into one or both of the resource servers 130, 140. For example, the offers management system 170 may be implemented as an offers engine that is integral to the resource servers 130, 140.

The client device 110, the resource servers 130 and 140, and the offers management system 170 may be in geographically disparate locations. Put differently, the client device 110 may be remote from at least one of the resource servers 130 and 140.

The client device 110, the resource servers 130 and 140, and the offers management system are computing systems. The client device 110 may take a variety of forms including, for example, a mobile communication device such as a smartphone, a tablet computer, a wearable computer such as a head-mounted display or smartwatch, a laptop or desktop computer, or a computing device of another type.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

In the example of FIG. 1, the resource servers 130 and 140 may provide both resource transfer processing (e.g., electronic fund transfers) and data holding (e.g., banking) functions. In particular, the resource servers 130 and 140 may each be both a financial institution server and also a payment transaction processing server. The resource servers 130 and 140 may, in some embodiments, be a proxy server, serving as an intermediary for requests for client devices 110 seeking resources from other servers.

Figure 2A:
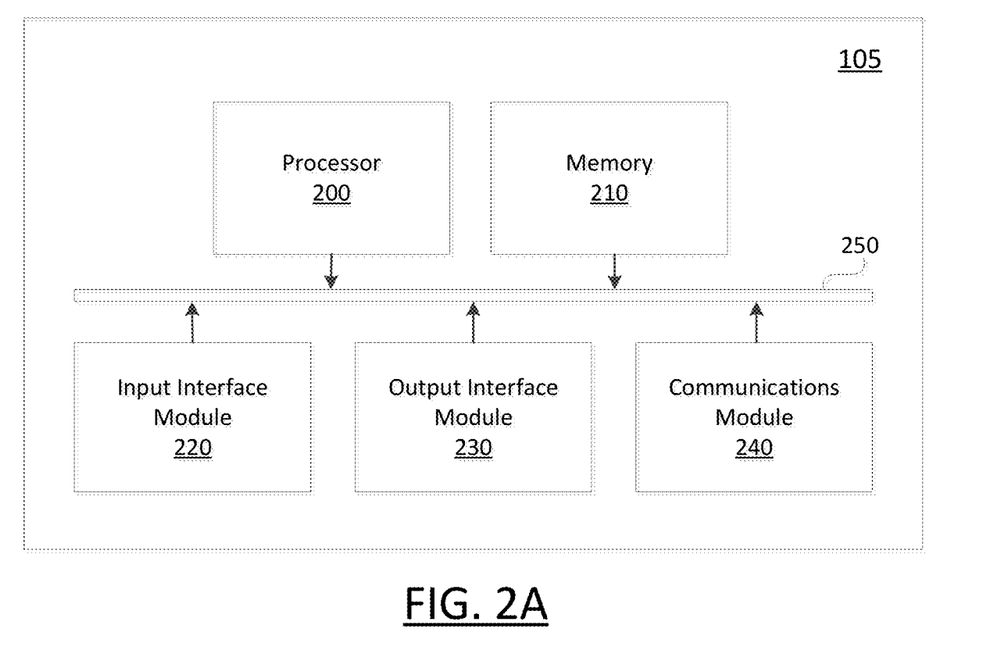
FIG. 2A is high-level schematic diagram of a computing device.

FIG. 2A is a high-level operation diagram of an example computing device 105. In at least some embodiments, the example computing device 105 may be exemplary of one or more of the client device, 110, the resource servers 130 and 140, and the offers management system 170. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may, for example, be flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
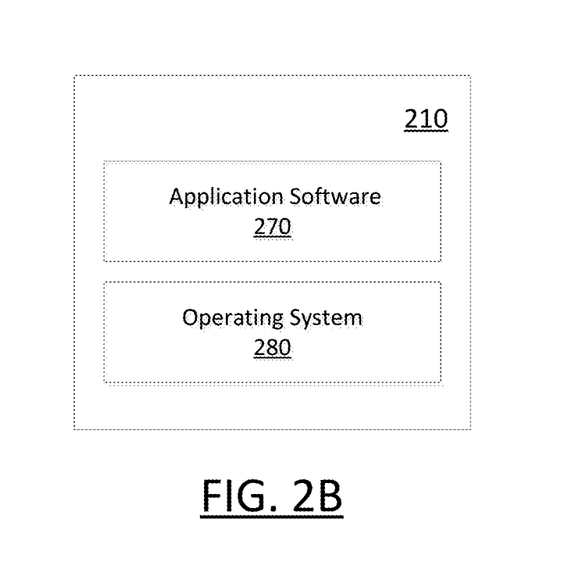
FIG. 2B shows a simplified organization of software components stored in a memory of the computing device of FIG. 2A.

FIG. 2B depicts a simplified organization of software components stored in memory 210 of the example computing device 105. As illustrated, these software components include application software 270 and an operating system 280.

The application software 270 adapts the example computing device 105, in combination with the operating system 280, to operate as a device performing a particular function. In some embodiments, the application software 270 may comprise a resource account management application. The resource account management application may, for example, be a personal banking application that is used to manage one or more banking accounts. The resource account management application may provide various functions such as resource transfers (e.g., electronic fund transfers, etc.), display of account balances, and other account management functions. For example, the resource account management application may enable users to configure requests for transfers of resources to accounts associated with the users. In particular, the resource account management application may be used to generate resource transfer requests. A user may input information, or parameters, for defining a resource transfer request such as the identity of the transferor, quantum of resources requested to be transferred, and account information for a designated account for receiving the transfer. Once it is defined, the resource transfer request can be transmitted, via the resource account management application, to a computing system for processing resource transfers. For example, the resource transfer request may be transmitted to a resource server managing the account(s) of the requesting entity, and the resource server may subsequently direct the request to a suitable computing system (e.g., a resource account management server) that is associated with the designated transferor for the resource transfer.

The operating system 280 is software. The operating system 280 allows the application software 270 to access the processor 200, the memory 210, the input interface module 220, the output interface module 230 and the communications module 240. The operating system 280 may, for example, be Apple iOS™, Google™ Android™, Linux™, Microsoft™ Windows™, or the like.

Figure 3:
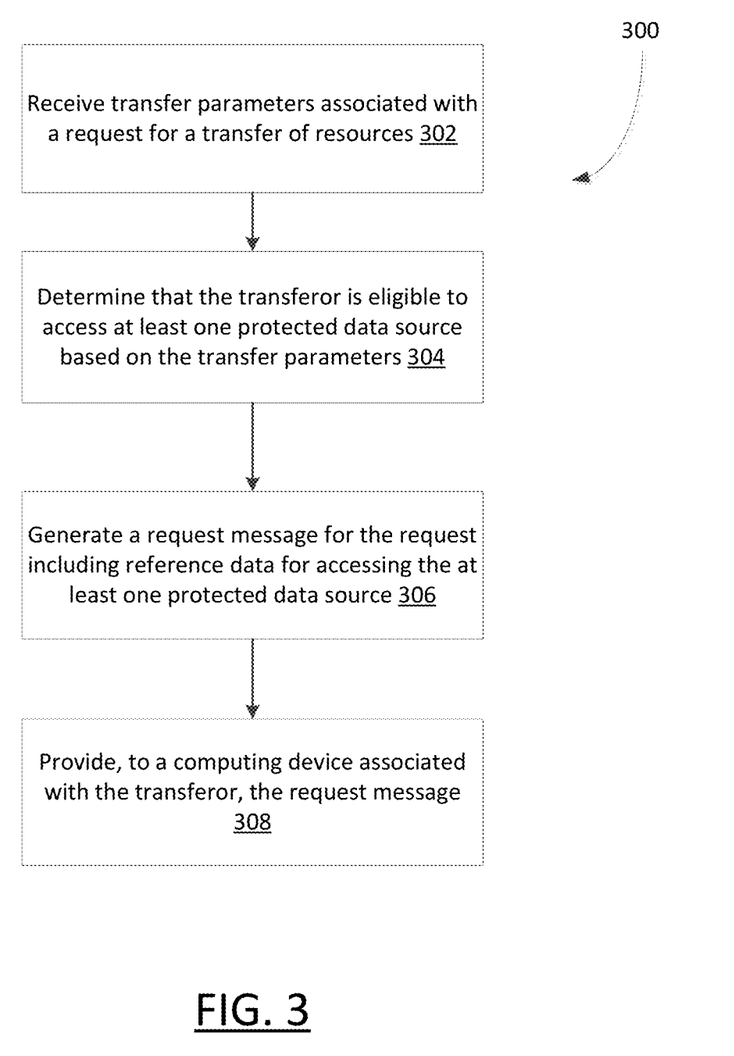
FIG. 3 shows, in flowchart form, an example method of processing a request for a real-time transfer of resources.

Reference is now made to FIG. 3, which shows, in flowchart form, an example method 300 of processing a request for a real-time transfer of resources. The method 300 may be implemented by a resource account management system, such as the resource server 130 of FIG. 1. Specifically, a computing system that manages resources associated with one or more resource accounts may be configured to implement the method 300 as part of its processing of requests to share, distribute, or otherwise transfer resources between resource accounts. The method 300 may be performed by a computing system that manages one or both of a sender and a recipient account associated with a resource transfer request.

Operations starting with operation 302 and continuing onward may be performed, for example, by the processor 200 (FIG. 2A) of a computing device 105 executing software comprising instructions such as may be stored in the memory 210 of the computing device 105. For example, the operations of the method 300 may be performed by a resource account management system associated with a transferee (or transfer requesting) entity, such as the resource server 130. More particularly, processor-executable instructions may, when executed, configure a processor 200 of the resource server 130 to perform all or parts of the method 300.

A computing system, such as a resource account management server, may receive information for defining a request for a transfer of resources. Specifically, in operation 302, a computing system receives transfer parameters associated with a resource transfer request. In particular, one or more parameters of a requested resource transfer for transferring a defined quantity of resources associated with a designated transferor are received by the computing system. The transfer parameters may be received, for example, via a user interface for generating requests for resource transfers. For example, a merchant (or other transfer requesting entity) may input the transfer parameters via a user interface (e.g., a GUI) of an application that provides a functionality of defining and transmitting resource transfer requests.

A "resource transfer request" may be a specially formatted message that is sent from a first resource account management system to a second resource account management system. In at least some embodiments, a resource transfer request may be sent via a transfer rail that is used for facilitating transfers between data records associated with different resource account management systems. For example, the first resource account management system may be associated with a first database and the second resource account management system may be associated with a second database. The databases may store account data. That is, the databases may store data that is associated with various resource accounts. In at least some implementations, each record in the database may be associated with a particular one of these accounts.

A resource transfer request is a message that is sent on behalf of a recipient to cause a transfer to be initiated from a sender (i.e., a transferor entity) to the recipient. For example, the resource transfer request may be sent, on behalf of the recipient, from the resource account management system associated with the recipient to the resource account management system associated with the sender. The resource transfer request may, for example, be a request to transfer resources (e.g., data) from a record in the database that is associated with the sender to a record in the database that is associated with the recipient. The resource transfer request may include one or more identifiers, such as an account number, that identify the record associated with the sender and/or the record associated with the recipient. The resource transfer request may also include one or more identifiers that identify the resource account management system associated with the sender and/or that identify the resource account management system associated with the recipient. Such identifiers may be or include one or more of: a transit number and an institution number.

The resource transfer request comprises a transfer initiation message. That is, the resource transfer request is an initial message that may be used to cause a transfer to occur. Since the resource transfer request is initiated by a recipient rather than a sender, the resource transfer request may be considered a pull-style transfer, which may be contrasted with typical push-style transfers. In at least some implementations, the request to transfer may be formatted as an ISO20022 message.

The resource transfer request message may be specially formatted to include parameters of a resource transfer that is requested to be made from and/or by a sender. In some embodiments, the transfer parameters may be included as metadata in the resource transfer request message. The transfer parameters include, at least, identifying information of a designated transferor associated with the requested resource transfer. Where the request to transfer is an ISO20022 message, the transfer parameters may be included in an ISO20022 format. Additionally, the transfer parameters may include resource definition data. The resource definition data defines what is requested to be transferred. By way of example, the resource definition data may define a resource that is stored in or otherwise associated with a record associated with the sender. The resource may, for example, be a computing resource. In another implementation, the resource may be electronic data. In some implementations, the resource may represent units of value, such as a quantity of a currency.

The transfer parameters that are included in the resource transfer request may include data of another type. For example, in some implementations, the transfer parameters may be or include transfer scheduling data. The transfer scheduling data may represent a time when the requested transfer is to be made. This time may, for example, a due date or deadline for the transfer. The due date or deadline may represent a latest time at which the transfer is to be made.

The resource transfer request message may, in some implementations, be or represent a request for payment. Such a message may be referred to as a request-for-payment (RFP) message or a request-to-pay (RTP) message. In such implementations, the transfer rail may be a payment rail such as a real-time payment rail, and the resource account management system may be a financial institution system. The data records may, for example, represent bank accounts and a transfer may be a request to transfer value from an identified sender bank account to the recipient bank account. The resource transfer request message may be sent from a first financial institution system associated with a first financial institution to a second financial institution system associated with a second financial institution.

The resource transfer request message may be a special transfer message which is not formatted as an email or short message service (SMS) message. Instead, it may be a computer-to-computer message that is formatted to be specially processed by the resource account management system that receives it. In at least some implementations, the computer-to-computer message may be formatted according to the ISO20022 standard. For example, the resource account management system that receives the resource transfer request message may be configured to execute a process for obtaining authorization to complete a transfer in response to receiving the resource transfer request. More particularly, the resource account management systems may be configured to only permit authorized transfers. For example, in one implementation, the database may store account data for a plurality of accounts and the associated resource account management system may only allow a transfer out of an account if the transfer is authorized by an authorization entity for that account, such as an account holder. Authorization may, for example, require authenticated approval using a credential such as one or more of: a username, password, biometric authentication data or other credential.

In some embodiments, in response to receiving the resource transfer request message, a resource account management system may identify an affected account using an identifier defined by the resource transfer request message. The resource account management system may subsequently send an electronic notification to a client device associated with the identified account. The notification may be provided as an in-app notification or operating system level notification. The notification may, for example, include a selectable option to authorize the requested resource transfer. The notification may allow the transfer to be made without requiring input of transfer parameters that are typically required when a transfer is initiated by the sender rather than the recipient. By way of example, one or more transfer parameters that are included in the resource transfer request may be used to pre-stage or pre-populate transfer parameters of the transfer so that the sender does not have to manually input such parameters. In some implementations, the resource definition data included in the resource transfer request may be used to allow the transfer to be made without having the sender define what is to be transferred. For example, where the transfer is a transfer of a computing resource or electronic data, the sender may perform, or cause to be performed, the transfer without having to input any information defining the computing resource or data involved. Additionally, or alternatively, where the transfer is a transfer of units of value, the amount of value defined in the resource transfer request message may be used so that the sender does not have to define the value requested to be transferred.

In some implementations, transfer scheduling data included in the resource transfer request message may be used to schedule the transfer without requiring the sender to define such a schedule. For example, where the transfer scheduling data includes indication of a due date or deadline, the resource account management system associated with the sender may automatically define a time for a transfer based on the transfer scheduling data without requiring the sender to manually input such time information.

In this way, the recipient (i.e., transfer requesting entity) may cause a resource account management system that is associated with the sender's record in a database to perform, or cause to be performed, a resource transfer without having to input any parameters for the transfer. The time and/or amount of the transfer may be extracted directly from the resource transfer request message, and the sender may only need to input an indication of consent to cause the transfer to be initiated when the sender has authenticated to the resource account management system. Additionally, or alternatively, in some implementations, the resource account management system may process the resource transfer request by using the parameters defined in the resource transfer request as default parameters for a pre-staged transfer which can be overridden through input of alternative parameters by the sender.

In operation 304, the computing system determines that the transferor associated with the requested resource transfer is eligible to access at least one protected data source based on the transfer parameters. In particular, the designated transferor of the resource transfer request is determined to be eligible for, or authorized to gain access to, one or more defined offers. In at least some embodiments, the computing system may query an offers management engine, such as the offers management system 170 of FIG. 1, in order to determine whether the transferor is eligible for any offers. The offers management engine may be associated with a plurality of offer-sponsoring entities (e.g., merchants), and store offer data of offers that are defined and made available by said entities. The computing system may obtain or access the offer data and determine the eligibility of the transferor for said offers.

For example, the computing system may generate an application programming interface (API) request based on the received transfer parameters for querying a server (or database, or other system) whether the transferor is eligible to access one or more defined offers. In some embodiments, the API query parameters may include an identifier of a specific merchant/biller/etc. (i.e., a transfer requesting entity) such that the API request may return eligibility information for offers associated with the merchant. The computing system may determine the eligibility of the transferor based on a response associated with the API request. Specifically, the computing system may determine whether the transferor is eligible for any offers based on a response from the offers management engine and obtain offer data (e.g., offer specification, redemption criteria, etc.) of offers for which the transferor is eligible.

The API request (or other query of the offers management engine) may specify transferor data associated with the transferor. In some embodiments, the transferor data may be obtained based on the resource transfer request. For example, identifying information for the transferor, such as name, email address, account number, etc., may be determined from input data (e.g., user-defined parameters) associated with the resource transfer request. Additionally, or alternatively, the computing system may obtain other information about the transferor which may be used in a determination of offer eligibility. Such information may include, without limitation, historical transactions data associated with the transferor, location history of the transferor (and/or device of the transferor), credit and/or payments history, service usage data, and the like.

In at least some embodiments, the computing system may itself determine whether the transferor is eligible for one or more offers. That is, rather than relying on an eligibility determination for the transferor that is rendered by an offers management engine, the computing system may itself identify the offers, if any, for which the transferor is eligible. By way of example, the computing system may obtain, from an offers management engine, redemption criteria data associated with a plurality of different offers and determine whether any of the criteria are satisfied based on transferor data associated with the transferor. If all or a required subset of the redemption criteria for an offer are determined to be satisfied based on the transferor data, the computing system may determine that the transferor is eligible for said offer.

Upon determining that the transferor is eligible to access the at least one protected data source (i.e., an offer), the computing system generates a request message for the resource transfer request, in operation 306. The request message includes reference data for accessing the at least one protected data source. In at least some embodiments, the reference data may comprise a unique identifier associated with the at least one protected data source. That is, the reference data may be data that uniquely identifies the at least one protected data source. In some embodiments, the at least one protected data source may comprise a web resource and the reference data may comprise a uniform resource locator (URL) associated with the web resource. Alternatively, the at least one protected data source may comprise an access-restricted message and the reference data may comprise a hyperlink associated with the message.

In operation 308, the computing system provides the request message of the resource transfer request to a computing device associated with the transferor. That is, the request message containing the reference data for accessing the at least one protected data source is communicated to the designated transferor for the resource transfer request.

In some embodiments, the computing system may cause the message data of the request message to be displayed via a user interface on a computing device associated with the transferor. For example, the request message for the resource transfer request may be transmitted to a resource account management system associated with the transferor with instructions for displaying the message data of the request message. The instructions may, for example, cause user interface elements for interacting with the message data to be displayed via the user interface. For example, one or more user interface elements associated with selectable options for accessing the at least one protected data source may be displayed.

Figure 4:
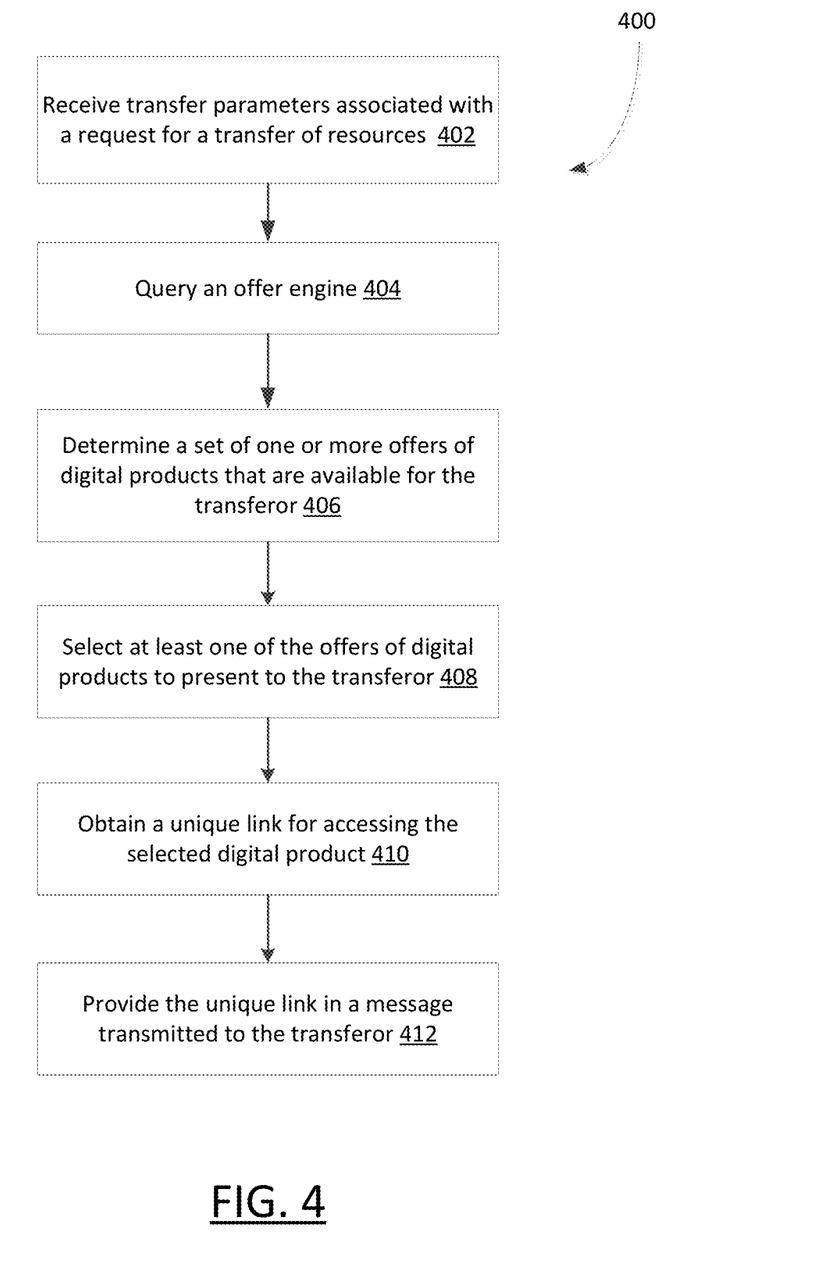
FIG. 4 shows, in flowchart form, another example method of processing a request for a real-time transfer of resources.

Reference is made to FIG. 4 which shows, in flowchart form, another example method 400 of processing a request for a real-time transfer of resources. The method 400 may be implemented by a resource account management system. Specifically, a computing system that manages a resource account/data record associated with a transferee (or transfer requesting) entity for a resource transfer may be configured to implement the method 400. The operations of method 400 may be performed, for example, by the processor 200 (FIG. 2A) of a computing device 105 executing software comprising instructions such as may be stored in the memory 210 of the computing device 105. For example, processor-executable instructions may, when executed, configure a processor 200 associated with a resource account management system (such as the resource server 130) to perform all or parts of method 400. The operations of method 400 may be performed in addition to, or as alternatives, to one or more of the operations of method 300 of FIG. 3.

In operation 402, the computing system receives transfer parameters associated with a request for a transfer of resources. The transfer parameters may be defined when a resource transfer request is generated by a transferee (or transfer requesting) entity for the resource transfer. For example, a transferee (e.g., a merchant, biller, etc.) may input one or more transfer parameters via a user interface of an application for generating resource transfer requests.

The computing system may determine whether the designated transferor for the requested resource transferor is eligible for, or authorized to access, any defined offers. Specifically, the computing system queries an offers management engine, in operation 404. The offers management engine, such as the offers management system 170 of FIG. 1, may render an eligibility determination for the transferor based on transferor data, such as transferor identifying information, historical transactions data, service usage data, and the like. In particular, the computing system may generate a query (e.g., via an API request) including the transferor data for submitting to the offers management engine.

In operation 406, the computing system determines a set of one or more offers of digital products that are available for the transferor. That is, the computing system determines the offers for which the transferor is eligible. In some embodiments, the set of offers may be specified in a response to the query of the offers management engine. In particular, the query response may identify one or more available offers for the transferor and offer data of said offers. The offer data may include, for example, offer specification (e.g., product type, discounts, rebates, etc.) identifying information of the offer-sponsoring entities, redemption criteria associated with the offers, access information for accessing the offers, and the like.

The computing system selects at least one of the available offers of digital products to present to the transferor for the resource transfer request, in operation 408. In some embodiments, the selection of offer(s) may be based on criteria, such as relevance, offer expiry date, estimated offer value, and the like. Such criteria may be used in determining a ranking of the available offers, and a defined number of the highest ranked offers may be selected by the computing system for presenting to the transferor.

In operation 410, the computing system obtains a unique link for accessing the selected digital product. In particular, a unique link (e.g., a URL) representing a location of a data source, such as a web document or message, where the digital product may be accessed is obtained by the computing system. The computing system provides the unique link in a request message of the resource transfer request that is provided to the transferor, in operation 412. That is, prior to sending the request message to the transferor, the computing system includes the unique link associated with the selected offers in the request message.

Figure 5:
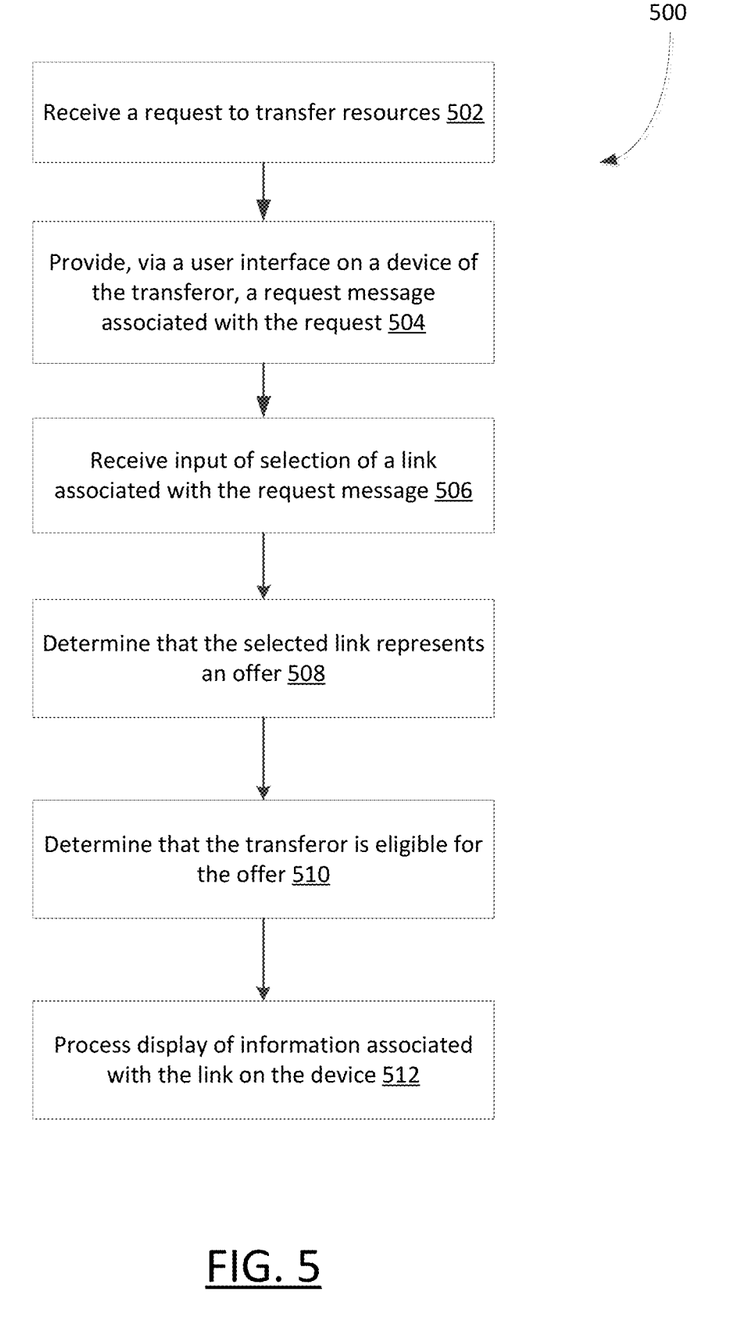
FIG. 5 shows, in flowchart form, an example method of presenting display data associated with a request for a real-time transfer of resources.

Reference is now made to FIG. 5, which shows, in flowchart form, an example method 500 of presenting display data associated with a request for a real-time transfer of resources. The method 500 may be implemented by a resource account management system. Specifically, a computing system that manages a resource account/data record associated with a designated transferor for a requested resource transfer may implement the method 500. The operations of method 500 may be performed, for example, by the processor 200 (FIG. 2A) of a computing device 105 executing software comprising instructions such as may be stored in the memory 210 of the computing device 105. For example, processor-executable instructions may, when executed, configure a processor 200 of a resource account management system (such as the resource server 140) to perform all or parts of method 500.

In operation 502, the computing system receives a request to transfer resources. The resource transfer request may be received, for example, from a resource account management system associated with a transfer requesting entity (i.e., transferee). In operation 504, the computing system provides, via a user interface on a device of the transferor, a request message associated with the resource transfer request. The request message may include transfer parameters associated with the requested resource transfer. For example, the request message may indicate an identity of the transfer requesting entity, a requested quantity of resources for transfer, a date (e.g., desired date or deadline) associated with the transfer, and the like. The display of the request message may include one or more links (or other reference data) for accessing data sources associated with the resource transfer. In some embodiments, a link associated with an invoice may be presented with the display of the request message. For example, the invoice may be an externally linked document generated by the transfer requesting entity, and the link may allow the transferor to access said document.

In operation 506, the computing system receives input of selection of a link associated with the request message. For example, the computing system may detect user input selecting a user interface element associated with the link. The computing system determines that the selected link represents a defined offer, in operation 508. Specifically, the computing system determines whether the selected link is associated with a location of a data source for accessing an offer (e.g., discounts, rebates, etc.). In some embodiments, the message data of the request message may include a flag indicating a content type associated with the at least one protected data source. The flag may be a content type indicator for the request message and may be set to, for example, indicate whether the link represents an offer or whether it represents some other content. Based on the flag (or other content/link type indicator) associated with the message, the computing system may determine that the selected link is associated with an offer (and not, for example, an externally linked invoice or similar document).

The computing system then proceeds to determine whether the transferor is eligible for the offer, in operation 510. If the transferor is determined to be eligible for the offer, the computing system processes display of information associated with the link on the device, in operation 512. By way of example, the computing system may retrieve display data associated with the offer(s) from a location defined by the link, and the retrieved display data may be presented via a user interface of an application (e.g., a web browser, a banking app, etc.) on the transferor's device.

In some embodiments, the selected link may allow for accessing the offer data of the offer(s) as well as one or more externally linked documents. For example, after the transferor accesses or views the offer data, they may be redirected to an address (i.e., a web location) where an externally linked document is stored. Accordingly, the link may be associated with a unique redirect such that the transferor is only able to access those externally linked documents that they are entitled to access.

Figure 6:
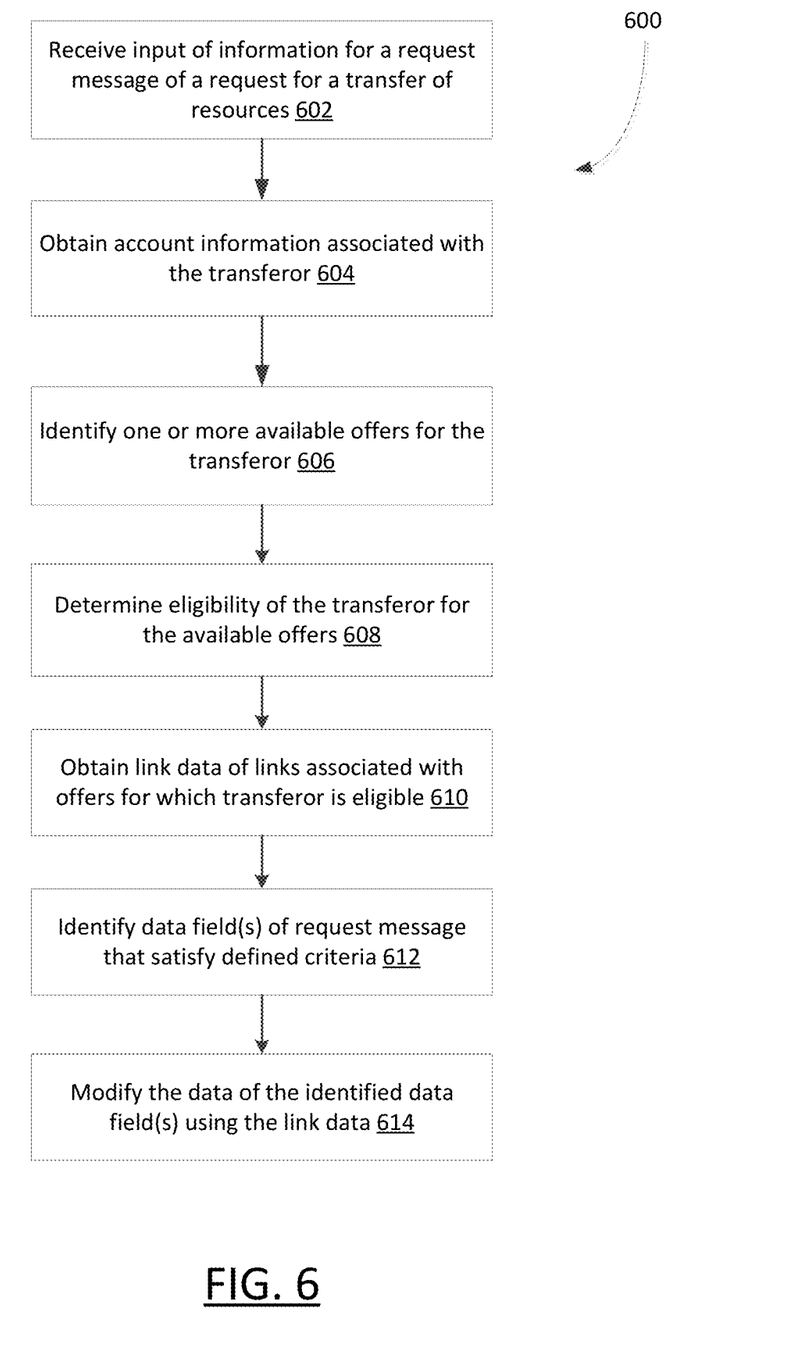
FIG. 6 shows, in flowchart form, an example method of generating a request message associated with a request for a real-time transfer of resources.

Reference is now made to FIG. 6 which shows, in flowchart form, an example method 600 of generating a request message associated with a request for a real-time transfer of resources. The method 600 may be implemented by a resource account management system, such as the resource server 130 of FIG. 1. Specifically, a computing system that manages resources associated with one or more resource accounts may be configured to implement the method 600 as part of its processing of requests to share, distribute, or otherwise transfer resources between resource accounts. The method 600 may be performed by a computing system that manages one or both of a sender and a recipient account associated with a resource transfer request. The operations of method 600 may be performed in addition to, or as alternatives of, one or more of the operations of methods 300 and 400.

In operation 602, the computing system receives input of information for a request message of a resource transfer request. The inputted information may include, for example, transfer parameters associated with the resource transfer request, such as type of transfer, identifier of the designated transferor, a quantity of resources requested to be transferred, and the like.

In operation 604, the computing system obtains account information associated with the designated transferor for the resource transfer request. In particular, the account information may be information relating to an account of the transferor with one or more offer-sponsoring entities. The account information may include, for example, an account number, name of owner, historical transactions and/or service usage data, etc. The computing system identifies one or more available offers for the transferor, in operation 606. Specifically, offers associated with one or more offer-sponsoring entities that are available and may be provided to the transferor is determined.

In operation 608, the computing system determines eligibility of the transferor for the available offers. The determination of eligibility may be performed in accordance with the techniques disclosed herein. For example, the computing system may query an offers management engine to determine eligibility of the transferor, and/or determine the eligibility based on redemption criteria associated with the set of available offers.

In operation 610, the computing system obtains link data of links associated with offers for which the transferor is eligible. The link data may comprise, for example, a unique reference, such as a URL, for a location where an offer of a product and display content associated therewith may be accessed.

In operation 612, the computing system identifies data fields of the request message that satisfy defined criteria. In some embodiments, the data fields may be those fields that contain specific types of data, such as a reference (e.g., URL) associated with a data source. For example, the computing system may identify those data fields which contain URLs associated with externally linked documents, such as invoices. As another example, the computing system may identify a data field that contains or is designated to contain replaceable data (as opposed to static data fields). That is, the identified data field may be for storing data that can be replaced and/or edited.

In operation 614, the computing system modifies the data of the identified data fields using the link data. In particular, the data contained in the data fields may be replaced using the link data of links associated with offers for presenting to the transferor. The replaced data (e.g., a link to an externally linked document) may be stored in association with the resource transfer request, or discarded. For example, the computing system may store, in a memory, the replaced data and/or the link data in association with the resource transfer request data.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
a processor;
a communications module coupled to the processor; and
a memory coupled to the processor, the memory storing instructions that, when executed, configure the processor to:
receive, via a first computing device associated with a transfer requesting entity, transfer parameters of a request for a first transfer of resources to the transfer requesting entity, the transfer parameters including an identifier of a designated transferor associated with the first transfer;
generate a request message for the request based on the received transfer parameters, the request message including a first data field containing first reference data for an external document associated with the first transfer;
determine that the transferor is eligible to access at least one protected data source based on transferor data associated with the transferor;
in response to determining that the transferor is eligible to access the at least one protected data source, modify the request message by replacing current data of the first data field with second reference data representing an authorization to access the at least one protected data source; and
provide, to a second computing device associated with the transferor, the modified request message.

2. The computing system of claim 1, wherein the at least one protected data source comprises a web resource and wherein the second reference data comprises a uniform resource locator (URL) associated with the web resource.

3. The computing system of claim 1, wherein the at least one protected data source comprises an access-restricted message and wherein the second reference data comprises a hyperlink associated with the message.

4. The computing system of claim 1, wherein determining that the transferor is eligible to access the at least one protected data source comprises:
generating an application programming interface (API) request based on the transfer parameters for querying a first server whether the transferor is eligible to access one or more of a set of defined offers; and
determining eligibility of the transferor based on a response associated with the API request.

5. The computing system of claim 4, wherein each of the defined offers is associated with respective criteria and wherein determining that the transferor is eligible comprises determining that the criteria associated with one or more of the defined offers are satisfied based on transferor data associated with the transferor.

6. The computing system of claim 5, wherein the transferor data comprises historical transactions data associated with the transferor.

7. The computing system of claim 1, wherein the second reference data comprises a unique identifier associated with the at least one protected data source.

8. The computing system of claim 1, wherein providing the modified request message comprises:
- causing to be displayed, via a user interface on the computing device, message data of the modified request message; and
- providing, on the user interface, one or more user interface elements associated with selectable options for accessing the at least one protected data source.

9. The computing system of claim 1, wherein message data of the modified request message includes a flag indicating a content type associated with the at least one protected data source.

10. A computer-implemented method, comprising:
- receiving, via a first computing device associated with a transfer requesting entity, transfer parameters of a request for a first transfer of resources to the transfer requesting entity, the transfer parameters including an identifier of a designated transferor associated with the first transfer;
- generating a request message for the request based on the received transfer parameters, the request message including a first data field containing first reference data for an external document associated with the first transfer;
- determining that the transferor is eligible to access at least one protected data source based on transferor data associated with the transferor;
- in response to determining that the transferor is eligible to access the at least one protected data source, modifying the request message by replacing current data of the first data field with second reference data representing an authorization to access the at least one protected data source; and
- providing, to a second computing device associated with the transferor, the modified request message.

11. The method of claim 10, wherein the at least one protected data source comprises a web resource and wherein the second reference data comprises a uniform resource locator (URL) associated with the web resource.

12. The method of claim 10, wherein the at least one protected data source comprises an access-restricted message and wherein the second reference data comprises a hyperlink associated with the message.

13. The method of claim 10, wherein determining that the transferor is eligible to access the at least one protected data source comprises:
- generating an application programming interface (API) request based on the transfer parameters for querying a first server whether the transferor is eligible to access one or more of a set of defined offers; and
- determining eligibility of the transferor based on a response associated with the API request.

14. The method of claim 13, wherein each of the defined offers is associated with respective criteria and wherein determining that the transferor is eligible comprises determining that the criteria associated with one or more of the defined offers are satisfied based on transferor data associated with the transferor.

15. The method of claim 14, wherein the transferor data comprises historical transactions data associated with the transferor.

16. The method of claim 10, wherein the second reference data comprises a unique identifier associated with the at least one protected data source.

17. The method of claim 10, wherein providing the modified request message comprises:
- causing to be displayed, via a user interface on the computing device, message data of the modified request message; and
- providing, on the user interface, one or more user interface elements associated with selectable options for accessing the at least one protected data source.

18. The method of claim 10, wherein message data of the modified request message includes a flag indicating a content type associated with the at least one protected data source.

19. A non-transitory, computer-readable storage medium containing instructions thereon which, when executed by a processor, configure the processor to:
- receive, via a first computing device associated with a transfer requesting entity, transfer parameters of a request for a first transfer of resources to the transfer requesting entity, the transfer parameters including an identifier of a designated transferor associated with the first transfer;
- generate a request message for the request based on the received transfer parameters, the request message including a first data field containing first reference data for an external document associated with the first transfer;
- determine that the transferor is eligible to access at least one protected data source based on transferor data associated with the transferor;
- in response to determining that the transferor is eligible to access the at least one protected data source, modify the request message by replacing current data of the first data field with second reference data representing an authorization to access the at least one protected data source; and
- provide, to a second computing device associated with the transferor, the modified request message.

* * * * *